(12) United States Patent
Tuerkoglu et al.

(10) Patent No.: US 12,194,505 B2
(45) Date of Patent: Jan. 14, 2025

(54) COMPUTER-IMPLEMENTED METHOD FOR SORTING OF PLASTIC COMPOUNDS

(71) Applicant: BASF SE, Ludwigshafen am Rhein (DE)

(72) Inventors: Gazi Tuerkoglu, Ludwigshafen (DE); Marina Grace Dickens Leed, Ludwigshafen (DE); Wilhelm Keller, Ludwigshafen (DE); Martina Solfrank, Ludwigshafen (DE); Robert Anthony Keller, Summit, NJ (US); Oliver Reich, Ludwigshafen (DE); David Leino Calleja, Moscow (RU); Li Noi Lilian Hoh, Ludwigshafen (DE); Oliver Kuhn, Rosport Luxembourg (FR); Shyam Sundar Sathyanarayana, Ludwigshafen (DE); Kai Pahnke, Ludwigshafen (DE); Tobias Eltze, Ludwigshafen (DE); Christian Beil, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/253,770

(22) PCT Filed: Nov. 19, 2021

(86) PCT No.: PCT/EP2021/082315
§ 371 (c)(1),
(2) Date: May 19, 2023

(87) PCT Pub. No.: WO2022/106625
PCT Pub. Date: May 27, 2022

(65) Prior Publication Data
US 2024/0009710 A1 Jan. 11, 2024

(30) Foreign Application Priority Data

Nov. 20, 2020 (EP) .................................. 20209008
Dec. 21, 2020 (EP) .................................. 20216014

(51) Int. Cl.
*B07C 5/34* (2006.01)
*B29B 17/02* (2006.01)
*G06Q 10/30* (2023.01)

(52) U.S. Cl.
CPC ............ *B07C 5/3412* (2013.01); *B29B 17/02* (2013.01); *G06Q 10/30* (2013.01);
(Continued)

(58) Field of Classification Search
CPC ...... B07C 5/3412; B07C 5/3416; G06Q 10/20
(Continued)

(56) References Cited

U.S. PATENT DOCUMENTS 10,717,113 B2 * 7/2020 Baque ..................... B07C 5/342
2011/0225098 A1 9/2011 Wolff et al.
(Continued)

FOREIGN PATENT DOCUMENTS

| EP | 3705197 A1 | 9/2020 |
| WO | WO-2011/159269 A1 | 12/2011 |
| WO | WO-2020/102613 A1 | 5/2020 |

OTHER PUBLICATIONS

European Search Report for EP Patent Application No. 20209008.0, Issued on Apr. 21, 2021, 3 pages.
(Continued)

*Primary Examiner* — Michael McCullough
*Assistant Examiner* — Jessica L Burkman
(74) *Attorney, Agent, or Firm* — Grüneberg and Myers PLLC (57) ABSTRACT

A computer-implemented method can be used for controlling sorting of plastic compounds. The method involves
(Continued)

providing a computer-based database containing entries on a plurality of markers each identifying a specific plastic compound; receiving scan data from a sample of a plastic compound; identifying a marker in the sample of the plastic compound based on the received scan data and the plurality of markers of the database; and sorting of plastic compounds based on the identified marker of the sample of the plastic compound.

19 Claims, 3 Drawing Sheets

(52) U.S. Cl.
CPC ............... *B29B 2017/0203* (2013.01); *B29B 2017/0279* (2013.01); *B29B 2017/0282* (2013.01)

(58) Field of Classification Search
USPC ........................................ 209/552
See application file for complete search history.

(56) References Cited

U.S. PATENT DOCUMENTS

| 2014/0199508 A1* | 7/2014 | Morgan ............... C08J 11/04 209/552 |
| 2018/0243800 A1 | 8/2018 | Kumar et al. |
| 2020/0361659 A1 | 11/2020 | Whitman et al. |

OTHER PUBLICATIONS

European Search Report for EP Patent Application No. 20216014.9, Issued on May 21, 2021, 4 pages.
International Search Report for PCT Patent Application No. PCT/EP2021/082315, Issued on Feb. 25, 2022, 4 pages.
Scott, et al., "Identification of plastic waste using spectroscopy and neural networks", Polymer Engineering and Science, vol. 35, Issue 12, Jun. 1995, pp. 1011-1015.
Written Opinion for PCT Patent Application No. PCT/EP2021/082315, Issued on Feb. 25, 2022, 9 pages.
International Preliminary Report on Patentability for PCT Patent Application No. PCT/EP2021/082315, issued Jun. 1, 2023, 11 pages.

* cited by examiner

COMPUTER-IMPLEMENTED METHOD FOR SORTING OF PLASTIC COMPOUNDS

CROSS-REFERENCE TO RELATED APPLICATIONS

This application is a National Stage entry under § 371 of International Application No. PCT/EP2021/082315, filed on Nov. 19, 2021, and which claims the benefit of priority to European Application No 20209008.0, filed on Nov. 20, 2020, and to European Application No. 20216014.9, filed on Dec. 21, 2020. The content of each of these applications is hereby incorporated by reference in its entirety.

FIELD OF THE INVENTION

The present disclosure relates to a computer-implemented method for sorting of plastic compounds, a computer-program element for such a method, a computer readable medium storing such a computer-program element, a plastic compound sorting device, a system for sorting of plastic compounds and a use of a computer-based database in such a method.

BACKGROUND OF THE INVENTION

Plastics show substantial benefits in terms of low weight, durability, low cost, applicability at wide temperature ranges, good temperature and light resistance as well as easy processing capabilities. Due to these benefits, the global demand of plastic increases every year and therefore the global production of plastic comprises a three-digit amount of million tons a year. A significant share of plastic is used for packaging, automotive, electrical goods. After use or end of lifetime only a small share of the generated plastic waste is reused. Recycling of plastic poses an option to reduce plastic waste and to save natural resources. Recycling of plastic waste requires separation and a sorting of the plastic waste due to the big variety of polymer types, grades, blends and/or additives. Therefore, sorting is a major issue for recycling of plastic waste. Recycling has a significant effect on economic aspects of recycling of plastic waste and on a sustainability of plastics in a value chain.

In view of this, it is found that a further need exists to provide a method for recycling plastics.

SUMMARY OF THE INVENTION

It is therefore an object of the present invention to provide a method control and improve sorting of plastic compounds.

These and other objects, which become apparent upon reading the following description, are solved by the subject-matter of the independent claims. The dependent claims refer to preferred embodiments of the present disclosure.

According to a first aspect of the present disclosure a computer-implemented method for sorting of plastic compounds is provided, comprising the steps of: providing a computer-based database comprising entries on a plurality of markers each identifying a specific plastic compound; receiving scan data from a sample of a plastic compound; identifying a marker in the sample of the plastic compound based on the received scan data and the plurality of markers of the database; sorting of plastic compounds based on the identified marker of the sample of the plastic compound.

In other words, the present disclosure proposes to tag unambiguously a plastic compound with markers and thereby generating an ID for the plastic compound. Properties of the plastic compound such as polymer type, grade, blend, number of reuse, sustainability score etc. are assigned to the ID. Information data of the ID and the properties of the plastic compound are stored in a database. By scanning, the plastic compound, the markers and therefor the ID of the plastic compound are determined and matched with the database. The result of the matching reveals the properties of the plastic compound such as the type of the plastic or the content of recycled material or the sustainability score. Hence, it is possible for a user, e.g. a recycling company of plastic parts, to sort the plastic compounds, or e.g. a retailer of products to sort plastic compounds in reverse vending machines.

The proposed method may be advantageous to sort plastic compounds consisting of different material layers and different material combinations. The proposed method may be advantageous to sort between recycled and non-recycled plastic compounds. The proposed method may be further advantageous to sort between food and non-food grade plastic compounds. The proposed method may be further advantageous to sort according to the number of recycling loops of the plastic compound. The proposed method may be further advantageous, because sorting is not sensitive to the color of the plastic compound. The proposed method may be further advantageous, because sorting is possible through shrink labels.

The proposed method is not limited to the end of life/recycling step in the plastic value chain but can be used for any purpose in any step of the plastic value chain. The method could for instance be used for an improved customer interaction/experience in the retail of plastic compounds such as plastic packaging. The proposed method may be advantageous for establishing an efficient recycling economy of plastic parts. The proposed method may be further advantageous to serve as a basis for product curriculum vitae comprising the sustainability score, and wherein further information (e.g. produced products with the specific plastic compound) is added to the curriculum vitae and stored in database. The proposed method may further be advantageous to reduce plastic waste and to increase an amount of recycled plastic waste. The proposed method helps to minimize material cross-contamination and maximizes the quality and subsequently the value of the reprocessed plastic compounds. The proposed method can also be used to trigger material exit from mechanical recycling loop to other recycling possibilities, namely chemical recycling, thermal recycling (incineration) or organic recycling.

The term sustainability score is to be understood broadly in the present case and comprises a figure configured to present information about the sustainability of a plastic compound, wherein the sustainability preferably relates to the content of recycled material of the plastic compound and/or the number recycling loops of the recycled material of the plastic compound. The sustainability score may comprise a metric, e.g. a verbal coding "bad", "good", "very good" or a color coding "red", "orange", "green" or a number coding "1", "2", "3". The sustainability score is not limited to the mentioned examples. The sustainability score may be based on data submitted by a master batcher and converter for an OEM, a Retailer, or End customer. The term computer-based database is to be understood broadly in the present case and comprises any database or data system, which is configured to store and manage data. The database may be central or decentral organized and may comprise different access authorizations to different users (e.g. read, read/write etc.). The database may be stored and executed on a cloud server. The database may be realized as a block chain network. The block chain may increase a protection against fake data and therefor increase the trust of customers. The block chain may increase analysis capabilities (e.g. determining loop number of recycled plastic compound). The term entry is to be understood broadly in the present case and comprises any data, which can be stored in a database, preferable the term entry relates to an ID of a plastic compound in the present case, e.g. a binary code. The term marker is to be understood broadly in the present case and comprises elements configured to disclose an information relating to a plastic compound ID. The term marker may comprise chemical tracers, i.e. molecules embedded in the plastic resin, acting as a binary code as the molecule is either present or not. Such chemical tracers show various spectroscopic properties and are therefore detectable (e.g. being florescent under UV light). By adding different chemical tracers, each with unique spectra, it is possible to create codes, which serve as entries of the database. These chemical tracers may be advantageous because they are insensitive to deformation or other physical stress and hence improve the detectability of plastic compound during the life cycle. The term marker may further comprise QR-data, digital watermarks, barcodes. The term scan data is to be understood broadly in the present case and comprises any data received from a scan and/or a detection process. Preferably, scan data comprises data from spectroscopic analysis and optical scanner (e.g. a camera of smartphone). The term plastic compound is to be understood broadly in the present case and comprises any plastic material in any possible stages of the life cycle or value chain of the plastic material. Preferably the term plastic compound comprises plastic feedstock (e.g. PE, PP, PET feedstock), semi-processed plastic material (e.g. semi-finished electronic and/or car interior parts, finished plastic material (e.g. PET bottle, packaging).

In an embodiment the computer-implemented method comprises the steps of: receiving a block chain storing a plurality of scan data of samples, a plurality of identified markers of samples and/or a plurality of sorting decisions of samples; uploading into the block chain the received scan data of the sample, the identified marker of the sample and/or the determined sorting decisions of the sample. The term block chain is well known in the state of the art and comprises in the present case a growing list of data/records that are linked using cryptography. The data/records comprise in the present a plurality of scan data of samples, a plurality of identified markers of samples and/or a plurality of sorting decisions of samples. The data/records are not limited to these examples. The data/records may also comprise timestamps and transaction data and related data to products of the sample (e.g. feedstock, semi-finished product, end product). By uploading a plurality of scan data of samples, a plurality of identified markers of samples and/or a plurality of sorting decisions an open ledger is extended due to a new record/entry. The ledger may be a distributed ledger, wherein every user may have a copy and may be able to generate a new entry and wherein the new entry may have to be validated by every user. In sum, this may be advantageous to increase a transparency of different stages of the life cycle and/or treatments of a specific plastic feedstock. This may further generate new data points related to the specific feedstock compound and increase analysis capabilities. This may further protect a user from deceptive entries/data related to a specific plastic feedstock (e.g. plurality of identified markers leads to fake data and reveals a deceptive sorting decision due to logic errors detected in the block chain). In other words, the scan data of specific plastic feedstock is recorded in the block chain at a transaction (e.g. any scan) and hence reveal the curriculum vitae of the feedstock and further products related to the feedstock (e.g. semi-finished product, product, waste). By use of a block chain, an authentication data may be provided based on data entries stored by upstream users along a life cycle of the feedstock compound. For access to the authentication data and sorting decisions an app may be used by customer/user.

In an embodiment the step of controlling sorting of plastic compounds comprises: identifying in the block chain at least one data entry associated with the identified marker of the sample; controlling sorting of plastic compounds based on the at least one data entry and the identified marker. In other words the identified markers of the sample are matched with existing entries comprising the identified markers. This may reveal the history of the specific plastic feedstock. This may reveal the number of reuses/loops of a specific plastic feedstock. E.g. a specific plastic feedstock is produced for plastic bottles, in case you find the specific plastic feedstock in another product (e.g. tooth brush) you can derive a reuse of the specific plastic feedstock. This may be advantageous to refine the sorting of plastic compounds.

In an embodiment, the step of identifying the marker comprises determining a type and/or a quantity of the marker in the sample of the plastic compound. The type of the marker may comprise the elements of the periodic system and combinations thereof. By determining the type of the marker, the ID of the specific plastic feedstock is determined. By determining the quantity of the marker the share of recycled plastic feedstock may be determined. This may be advantageous to control the sorting decision. The determining of the marker may comprise UV detection technique, a near infra-red detection technique, mid infra-red detection technique, an X-ray fluorescence detection technique, neuron activation technique or a magnetic detection technique, e.g. NMR.

In an embodiment, the step of identifying the marker comprises determining a weight portion of the marker in the sample of the plastic compound. By determining the marker and its volume content in a sample, you can also derive the weight content by calculation. Quantification can also be done by determining the relative ratio of different marker systems in the sample. This may be advantageous to refine sorting of plastic compounds due to a more specific description of the material composition of the sample of the plastic compound.

In an embodiment a method is provided, wherein the marker is selected from the group consisting of UV marker, NMR marker, IR marker, XRD marker, XRF marker, QR code and/or steganographic feature.

In an embodiment a method is provided, wherein further information is added to specific plastic compound by a user executing the method, wherein the further information preferably comprises a stage in value chain and/or a product type. This may be advantageous to certify recycled content.

In an embodiment a method is provided, wherein user of the block chain validate every new entry. This may advantageous to increase protection against fake entries.

In an embodiment a method is provided, wherein the sample of the plastic compound comprises one or more elements selected from the group consisting of: low density polyethylene (LDPE), linear LDPE (LLDPE), high density polyethylene (HDPE), polyoxmethylene (POM) polypropylene (PP), polyamide (PA), poly ethylene terephthalate (PET), poly butylene terephthalate (PBT), acrylnitril-butadiene-styrene (ABS), polymethylmethacrylate (PMMA), thermoplastic polyurethane (TPU), polystyrene (PS), polylactic acid (PLA), polyvinylchloride (PVC) or polycarbonate (PC).

A further aspect of the present disclosure relates to a Computer-program element, which, when executed, instructs a processor to perform any one of the steps of the above described method. The computer program element might therefore be stored on a computing unit, which might also be part of an embodiment. This computing unit may be configured to perform or induce performing of the steps of the method described above. Moreover, it may be configured to operate the components of the above described system. The computing unit can be configured to operate automatically and/or to execute the orders of a user. A computer program may be loaded into a working memory of a data processor. The data processor may thus be equipped to carry out the method according to one of the preceding embodiments. This exemplary embodiment of the present disclosure covers both, a computer program that right from the beginning uses the present disclosure and computer program that by means of an update turns an existing program into a program that uses the present disclosure. Moreover, the computer program element might be able to provide all necessary steps to fulfil the procedure of an exemplary embodiment of the method as described above. According to a further exemplary embodiment of the present disclosure, a computer readable medium, such as a CD-ROM, USB stick or the like, is presented wherein the computer readable medium has a computer program element stored on it which computer program element is described by the preceding section. A computer program may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network. According to a further exemplary embodiment of the present disclosure, a medium for making a computer program element available for downloading is provided, which computer program element is arranged to perform a method according to one of the previously described embodiments of the present disclosure.

A further aspect of the present disclosure relates to a Computer readable medium storing the above described computer program element.

A further aspect of the present disclosure relates to a plastic compound sorting device, comprising: a wavelength scanner; a programmable controller; wherein the wavelength scanner is configured for scanning a sample of a plastic compound; wherein the programmable controller is configured for sorting plastic compounds by means of the above described method. The term wavelength scanner is to be understood broadly in the present case and comprises a scanner that is configured to determine a wavelength of an atom or a molecule. The term wavelength scanner comprises scanners based on UV detection technique, a near infra-red detection technique, mid infra-red detection technique, an X-Ray fluorescence detection technique or neuron activation technique. The term programmable controller is to be understood broadly in the present case and comprises controller, which are configured to be programmed and controlled to execute the method described above. The term programmable controller comprises preferably a CPU of a smartphone, tablet, desktop pc, or a cloud. In this content, the plastic compound handling device preferably comprises a user interface, wherein the user interface is configured for displaying the determined sustainability score (e.g. display of a smartphone).

A further aspect of the present disclosure relates to a system for sorting of plastic compounds, comprising: a computer-based database comprising entries on a plurality of markers each identifying a specific plastic compound; at least one receiving unit configured to receive scan data from a sample of a plastic compound; at least one processing unit configured to identify a marker in the sample of the plastic compound based on the received scan data and the plurality of markers of the database; at least one sorting unit configured to sort plastic compounds based on the identified marker of the sample of the plastic compound. The receiving unit and/or processing units may be distributed hardware components (e.g. separate CPUs), virtual components on one hardware component (e.g. central CPU). The receiving unit may comprise an interface with a specific communication standard (e.g. Ethernet, USB, HTML, NFC, Bluetooth, PCI etc.). The sorting unit may mechanically sort the plastic compounds, e.g. by means of a controllable air current.

A last aspect of the present disclosure relates to a use of a computer-based database comprising entries on a plurality of markers each identifying a specific plastic compound and/or scan data from a sample of a plastic compound in a method described above.

In an embodiment, the step of identifying the marker comprises determining parameters from the previous lifecycle of the plastic compound based on the identified marker in said sample of the plastic compound and/or determining the content of recycled plastic of the plastic compound. Lifecycle refers to the period from production of the plastic compound till disposal and recycling of the same. The identified markers may be associated with a specific product and may therefor reveal the parameters from the previous lifecycle of the plastic compound. A share of determined markers in the sample may reveal the content of recycled plastic of the plastic compound. A material recycler may adapt the share of markers in the plastic compound each time he produces a plastic compound. In sum, this may be advantageous to refine the sorting of plastic compounds. For example every time a material recycler produces a plastic compound an additional marker may be added to the plastic compound. The marker may indicate the number of times the plastic compound has been recycled.

The exit of plastic compound from sorting process preferably to other recycling possibilities, very preferably from e.g. mechanical recycling to chemical recycling, to thermal recycling (incineration) and/or to organic recycling, can be triggered based on the determined number of lifecycles and/or content of recycled plastic of the plastic compound.

In an further embodiment, the determined number of lifecycles and/or content of recycled plastic of the plastic compound can also be used to trigger the exit of a plastic compound from a closed loop recycling process, e.g. recycling of plastic bottles, to another application, e.g. non-food contact packaging material.

BRIEF DESCRIPTION OF THE DRAWINGS

In the following, the present disclosure is described exemplarily with reference to the enclosed figure, in which.

DETAILED DESCRIPTION OF EMBODIMENT

Figure 1:
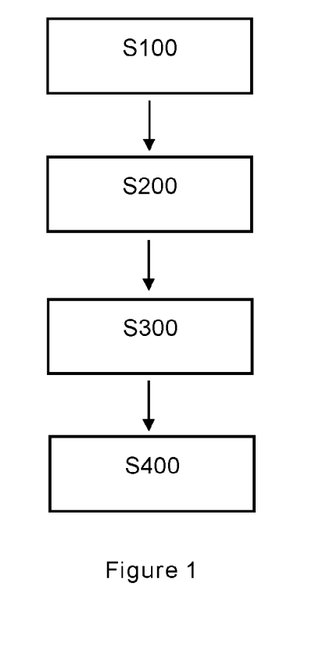
FIG. 1 is a schematic overview of the steps of a method according to the present disclosure.

FIG. 1 shows a schematic overview of the steps of a method according to the present disclosure. The computer-implemented method for controlling sorting of plastic compounds, comprises the step S100 of providing a computer-based database comprising entries on a plurality of markers each identifying a specific plastic compound. The identified markers reveal an ID for a specific plastic compound to which data is associated. In the present example the ID comprises a binary system with 5 digits (0 or 1) realized with 5 different markers. In case a marker is detected the respective digit is 1 otherwise 0. Hence, you are able to code 2^5 different IDs with the markers. This will be further explained in FIG. 2. The data comprises in the present example batch size of the specific plastic compound, production data, target product and sustainability score. The database is in the present example a computer-based database, which is stored in a cloud. The entries of the specific plastic compounds are created from authorized plastic material producers. In step S200 scan data from a sample of a plastic compound is received. Preferably, the scan data comprises data from spectroscopic analysis. The markers used to code the specific plastic compound are chemical tracers. The chemical tracers show various spectroscopic properties and are therefore detectable via a spectroscopy. In step S300 a marker in the sample of the plastic compound is identified based on the received scan data and the plurality of markers of the database. The scan data for example reveals weather one or more markers are present in the spectroscopy measurement data or not. These results are matched with the entries of the database. In case of a positive match the data associated with the ID of the specific plastic compound is revealed. In a step S400 a sorting decision based on the identified marker of the sample of the plastic compound is determined. The sorting decision is in the present example a part of the data associated with the ID of a specific plastic compound. But the controlling of sorting of plastic compounds is not limited to this example. It is further preferred that the received scan data of the sample, the identified marker of the sample and/or the determined sorting decision of the sample is uploaded into a block chain. By uploading these information into the block chain a ledger is extended and therefor generates a high transparency of the curriculum vitae the specific plastic compound. In this context the sorting of plastic compounds may be controlled by analysis of all existing entries to the block chain, which may result in a refined sorting decision.

Figure 2:
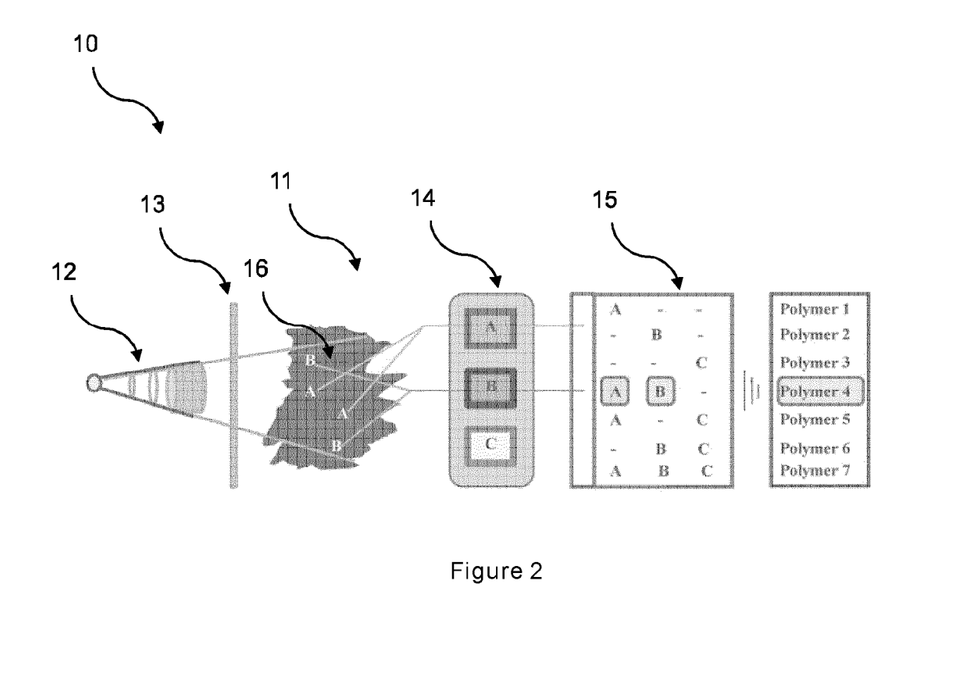
FIG. 2 is a schematic partial view of the plastic compound sorting device according to the present disclosure.

FIG. 2 is a schematic partial view of the plastic compound sorting device 10 according to the present disclosure. The plastic compound handling device 10, comprises a wavelength scanner 11, in the present example an X-ray fluorescence scanner, comprising an X-ray generator 12 as illumination source, a copper filter 13 for reducing noise of measurement and an X-ray fluorescence detection unit 14. The plastic compound system further comprises a programmable controller 15. The specific plastic compound 16 comprises two markers A and B. The X-ray generator 12 is configured generate X-rays and to direct them to specific plastic compound 16, wherein the X-ray excite the markers A, B. The markers are for example Fe and Ni. Each marker emits a unique radiation in X-ray fluorescence spectrometry, which depends on the atomic number of the element. The X-ray fluorescence scanner 14 is configured to for scanning a sample of the plastic compound 16, wherein scanning means detecting the emitted radiation of the markers. The X-ray fluorescence scanner is coupled with the programmable controller 15, which identifies the signature respectively the ID of the specific plastic compound 16. The programmable controller 15 is further configured for sorting plastic compounds by means of the above described method.

Figure 3:
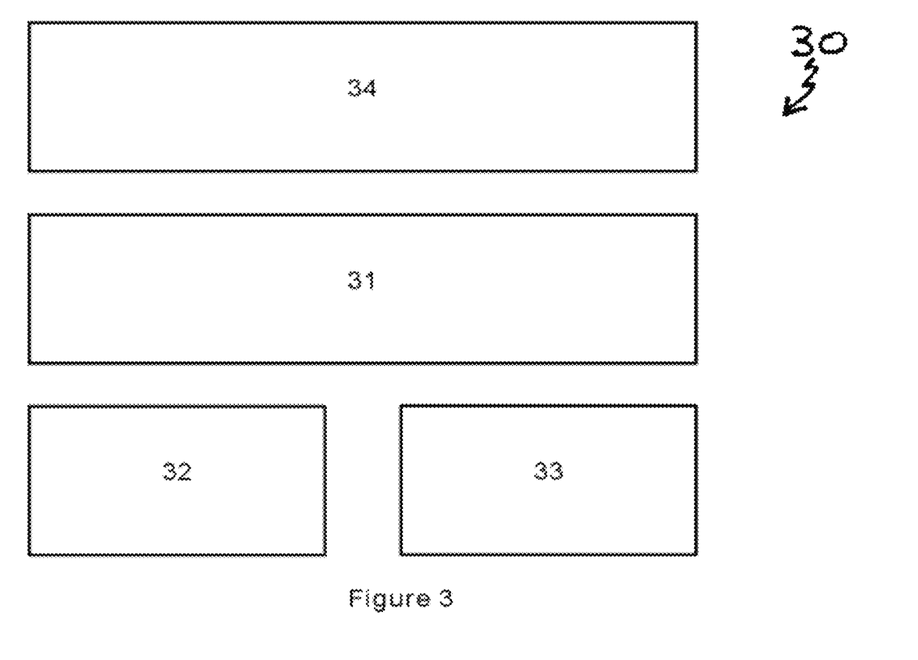
FIG. 3 is an overview of a system according to the present disclosure.

FIG. 3 shows an overview of a system according to the present disclosure. The system 30 for sorting of plastic compounds comprises a computer-based database 31 comprising entries on a plurality of markers each identifying a specific plastic compound The system 30 further comprises one receiving unit 32 configured to receive scan data from a sample of a plastic compound. The system 30 further comprises one processing unit 33 configured to identify a marker in the sample of the plastic compound based on the received scan data and the plurality of markers of the database. The sorting unit 34 is further configured to sort plastic compounds based on the identified marker of the sample of the plastic compound. The processing unit is further configured to upload the received scan data of the sample, the identified marker of the sample and/or the determined sorting decision of the sample is uploaded into a block chain 35. By uploading these information into the block chain 35 a ledger is extended and therefor generates a high transparency of the curriculum vitae the specific plastic compound. In this context the sorting decision may be further determined by analysis of all existing entries to the block chain 35, which may result in an improved sorting of plastic compound.

Figure 4:
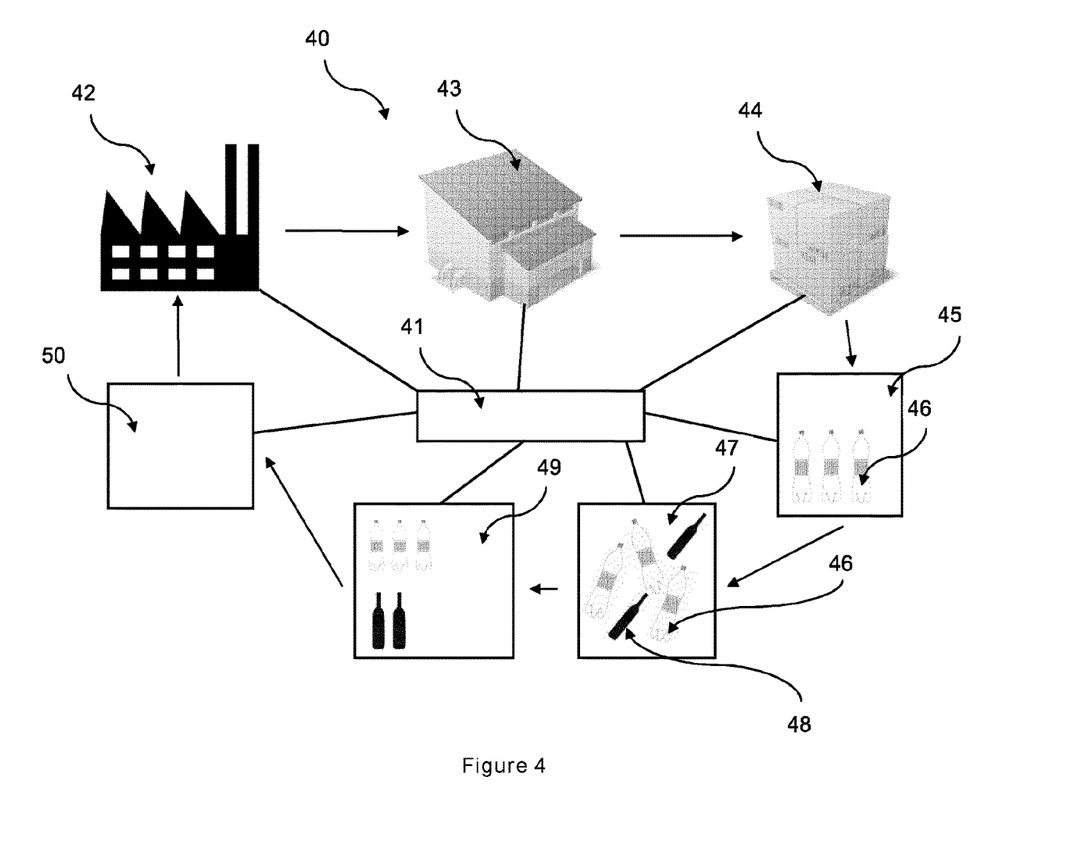
FIG. 4 shows an exemplary application case of the method in a circular economy.

FIG. 4 shows an exemplary application case of the method in a circular economy 40. A plastic compound producer 42 may produce in a first step a specific plastic compound comprising a marker A. The corresponding data of the specific plastic compound may be transmitted to a digital platform 41, wherein the digital platform respectively the servers of the digital platform may store the corresponding data. The plastic compound producer 42 may sell the specific plastic compound to a manufacturer 43 for plastic bottles. The production data of the plastic bottles (e.g. time stamp, amount etc.) related to the specific plastic compound may be transmitted to the digital platform 41. The produced plastic bottles may comprise a QR-code and may then be shipped from the manufacturer 43 to a warehouse 44 for example in another country and from there to a retailer 45. The related transportation data for the plastic bottles 46 may each be transmitted the digital platform 41. Then a customer may buy the plastic bottle 46 from the retailer 45. The customer may dispose the plastic bottle 46 after use. A waste comprising the plastic bottle 46 and a further plastic bottle 48 with another marker B may then be collected by a waste disposal company 47. The waste disposal company 47 may have a sorting machine 49. The sorting machine 49 may identify the plastic bottle 46 with the specific plastic compound with the marker A. The collected data related to the plastic bottle 46 may be transmitted from the waste disposal company 47 to the digital platform 41. The waste disposal company 47 may sell the plastic bottle 46 to a recycling company 50 that produces a new specific plastic material. The recycling company 50 may add a further marker C to the plastic material and then may sell the plastic material to the plastic compound producer 42. The recycling company 50 may query the data related to the plastic bottle 46 from the digital platform 41 and further transmit new data to the digital platform 41.

The present disclosure has been described in conjunction with a preferred embodiment as examples as well. However, other variations can be understood and effected by those persons skilled in the art and practicing the claimed invention, from the studies of the drawings, this disclosure and the claims. Notably, in particular the described steps can be performed in any order, i.e. the present disclosure is not limited to a specific order of these steps. Moreover, it is also not required that the different steps are performed at a certain place or at one place, i.e. each of the steps may be performed at a different place using different equipment/data processing units. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

REFERENCE LIST 10 plastic compound sorting device
11 wavelength scanner
12 X-ray generator
13 copper filter
14 X-ray fluorescence scanner
15 programmable controller
16 plastic compound
30 system
31 database
32 receiving unit
33 processing unit
34 sorting unit
35 block chain
40 circular economy
41 digital platform
42 plastic compound producer
43 manufacturer
44 warehouse
45 retailer
46, 48 plastic bottle
47 waste disposal company
49 sorting machine
50 recycling company

The invention claimed is:

1. A computer-implemented method for controlling sorting of plastic compounds, comprising:
providing a computer-based database comprising entries on a plurality of markers each identifying a specific plastic compound;
receiving scan data from a sample of a plastic compound;
identifying a marker in the sample of the plastic compound based on the received scan data and the plurality of markers of the database, wherein the identified marker includes a chemical tracer used to tag a recycled material in the sample of the plastic compound; and
sorting of plastic compounds based on the identified marker of the sample of the plastic compound.

2. The computer-implemented method according to claim 1, comprising:
receiving a block chain storing a plurality of scan data of samples, a plurality of identified markers of samples, and/or a plurality of sorting decisions of samples; and
uploading into the block chain the received scan data of the sample, the identified marker of the sample, and/or the sorting decision of the sample.

3. The computer-implemented method according to claim 2, wherein the sorting of plastic compounds comprises:
identifying in the block chain at least one data entry associated with the identified marker of the sample; and
sorting of plastic compounds based on the at least one data entry and the identified marker.

4. The computer-implemented method according to claim 1, wherein the identifying of the marker comprises: determining a type and/or a quantity of the marker in the sample of the plastic compound.

5. The computer-implemented method according to claim 1, wherein the identifying of the marker comprises: determining a weight fraction of marked content in the sample of the plastic compound.

6. The computer-implemented method according to claim 1, wherein the identifying of the marker comprises:
determining a number of lifecycles of the plastic compound based on the identified marker in said sample of the plastic compound and/or determining the content of recycled plastic of the plastic compound.

7. A method for mechanical recycling of plastic compounds, comprising:
sorting plastic compounds with the computer-implemented method of claim 6,
wherein the plastic compounds exited from the sorting goes to a further recycling.

8. The method according to claim 7, wherein the further recycling is a chemical recycling, thermal recycling, and/or organic recycling.

9. The computer-implemented method according to claim 1, comprising:
triggering exit of the plastic compound from the sorting, based on the determined number of lifecycles and/or content of recycled plastic of the plastic compound.

10. The computer-implemented method according to claim 9, wherein the plastic compound exits the sorting to a further recycling.

11. The computer-implemented method according to claim 10, wherein the further recycling is a chemical recycling, thermal recycling, and/or organic recycling.

12. The computer-implemented method according to claim 1, comprising:
generating a signal, which comprises the command to display the sorting decision on a user interface.

13. The computer-implemented method according to claim 1, wherein the marker is selected from the group consisting of UV marker, NMR marker, IR marker, XRD marker, XRF marker, QR code, barcode, and steganographic feature.

14. The computer-implemented method according to claim 1, wherein the sample of the plastic compound comprises one or more elements selected from the group consisting of: low density polyethylene (LDPE), linear LDPE (LLDPE), high density polyethylene (HDPE), polyoxymethylene (POM) polypropylene (PP), polyamide (PA), poly ethylene terephthalate (PET), poly butylene terephthalate (PBT), acrylonitrile-butadiene-styrene (ABS), polymethylmethacrylate (PMMA), thermoplastic polyurethane (TPU), polystyrene (PS), polylactic acid (PLA), polyvinylchloride (PVC), and polycarbonate (PC).

15. A method for recycling of plastic compounds, comprising:
sorting plastic compounds with the computer-implemented method of claim 1.

16. A non-transitory computer-readable medium comprising instructions, which, when executed, instructs a processor to perform one or more operations of claim 1.

17. A plastic compound sorting device, comprising:
a wavelength scanner; and
a programmable controller;
wherein the wavelength scanner is configured for scanning a sample of a plastic compound;
wherein the programmable controller is configured for sorting plastic compounds by the method according to claim 1.

18. A system for sorting of plastic compounds, comprising:
a computer-based database comprising entries on a plurality of markers each identifying a specific plastic compound;
at least one receiver configured to receive scan data from a sample of a plastic compound;
at least one processor configured to identify a marker in the sample of the plastic compound based on the received scan data and the plurality of markers of the database, wherein the marker includes a chemical tracer used to tag a recycled material in the sample of the plastic compound; and
at least one sorter configured to sort plastic compounds based on the identified marker of the sample of the plastic compound.

19. The system according to claim 18, wherein the at least one processor is configured to identify the marker by determining a number of lifecycles of the plastic compound based on the identified marker in said sample of the plastic compound and/or determining the content of recycled plastic of the plastic compound.

* * * * *